US010802861B2

(12) United States Patent
Noorshams et al.

(10) Patent No.: US 10,802,861 B2
(45) Date of Patent: Oct. 13, 2020

(54) ACCESSING HOST SERVICES FOR VIRTUAL GUEST OPERATING SYSTEMS

(71) Applicant: International Business Machines Corporation, Armonk, NY (US)

(72) Inventors: Qais Noorshams, Boeblingen (DE); Dieter Wellerdiek, Ammerbuch (DE)

(73) Assignee: International Busienss Machines Corporation, Armonk, NY (US)

( * ) Notice: Subject to any disclaimer, the term of this patent is extended or adjusted under 35 U.S.C. 154(b) by 180 days.

(21) Appl. No.: 15/826,890

(22) Filed: Nov. 30, 2017

(65) Prior Publication Data

US 2019/0163513 A1 May 30, 2019

(51) Int. Cl.
*G06F 9/455* (2018.01)
*G06F 9/50* (2006.01)

(52) U.S. Cl.
CPC ........ *G06F 9/45558* (2013.01); *G06F 9/4555* (2013.01); *G06F 9/45545* (2013.01); *G06F 9/5055* (2013.01)

(58) Field of Classification Search
CPC ............... G06F 9/45558; G06F 9/4555; G06F 9/45545; G06F 9/5055
See application file for complete search history.

(56) References Cited

U.S. PATENT DOCUMENTS

| 9,015,706 B2 | 4/2015 | Conover | |
| 2007/0171921 A1 | 7/2007 | Wookey | |
| 2013/0227556 A1* | 8/2013 | Tsirkin | G06F 21/53 718/1 |
| 2014/0053272 A1* | 2/2014 | Lukacs | G06F 21/53 726/24 |

(Continued)

OTHER PUBLICATIONS

Koh et al., "Improving Virtualized Windows Network Performance by Delegating Network Processing", 2009 Eighth IEEE International Symposium on Network Computing and Applications, pp. 203-210, 978-0-7695-3698-9/09, © 2009 IEEE, DOI 10.1109/NCA.2009.49.

(Continued)

*Primary Examiner* — Jung W Kim
*Assistant Examiner* — Bruce S Ashley
(74) *Attorney, Agent, or Firm* — William H. Hartwell

(57) ABSTRACT

In one embodiment, in accordance with the present invention, a method, computer program product, and system for accessing non-functional host capabilities and services of a host operating system, by a guest operating system, are provided. The method includes a hypervisor, of a host OS, intercepting a hardware instruction from a guest operating system, wherein the hardware instruction is associated with data located in a register and in memory that is accessible by the hypervisor. The method further includes analyzing the hardware instruction and data to determine if the hardware instruction is a non-functional service request. The method further includes, upon determining that the hardware instruction is a non-functional service request, executing the related non-functional service request and writing a response to the associated memory. The method further includes notifying the guest operating system that the execution of the non-functional service request is complete and the response is available.

14 Claims, 12 Drawing Sheets

(56) References Cited

U.S. PATENT DOCUMENTS

2014/0189690 A1* 7/2014 Ramakrishnan Nair ..................... G06F 9/461
718/1
2017/0220369 A1* 8/2017 Kaplan ............... G06F 9/45558
2018/0203795 A1 7/2018 Gadiya
2019/0163603 A1 5/2019 Brown

OTHER PUBLICATIONS

Mell et al., "The NIST Definition of Cloud Computing", Recommendations of the National Institute of Standards and Technology, Special Publication 800-145, Sep. 2011, 7 pages.

Smith et al., "Virtual Machines: Versatile Platforms for Systems and Processes", Chapter 8, System Virtual Machines, pp. 369-443, © 2005 by Elsevier Inc.

Noorshams et al., "Accessing Host Services for Virtual Guest Operating Systems", U.S. Appl. No. 15/883,146, filed Jan. 30, 2018, 56 pages.

IBM, Appendix P, List of IBM Patents or Patent Applications Treated as Related, dated Jan. 30, 2018, 2 pages.

* cited by examiner

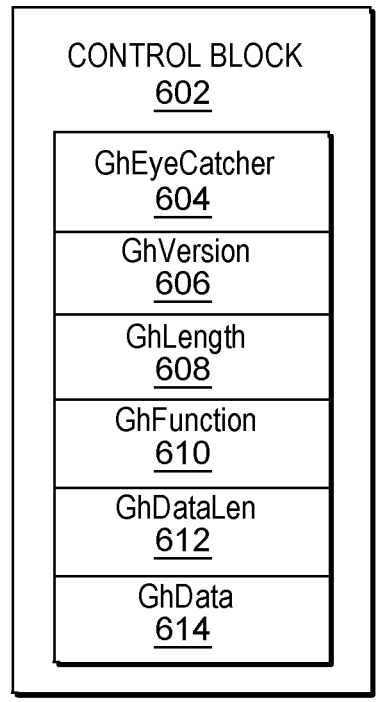
FIG. 6A
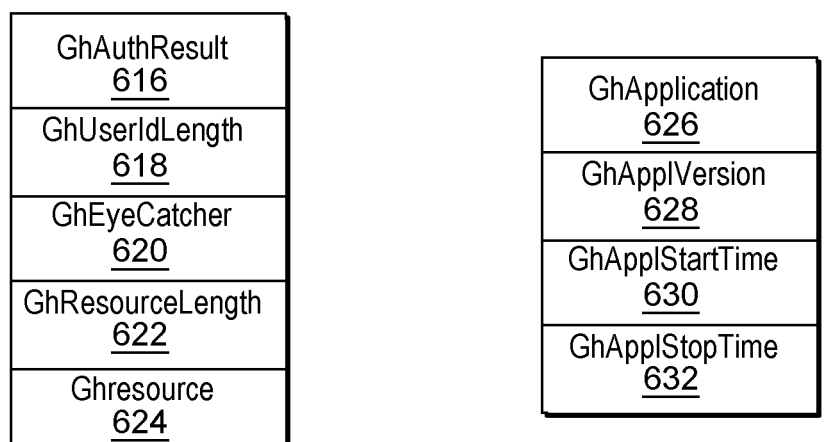
FIG. 6B
FIG. 6C

ACCESSING HOST SERVICES FOR VIRTUAL GUEST OPERATING SYSTEMS

BACKGROUND

The present invention relates generally to the field of virtual guest operating systems, and more particularly to accessing non-functional host capabilities and services.

A hypervisor, also referred to as a virtual machine monitor (VMM), is computer software, firmware, or hardware on a host computer that can create and execute one or more virtual machines (e.g., guest operating system), also referred to as guest computers. A hypervisor provides a guest operating system (OS) with a virtual operating environment and manages the execution of the guest operating systems. A hypervisor allows multiple instances for a variety of guest operating systems to share the virtualized hardware resources of a host. For example, operating system instances such as Linux, Windows, and MacOS can all execute on the same host computer (Note: the terms "Linux," "Windows," and "MacOS" may be subject to trademark rights in various jurisdictions throughout the world and are used herein only in reference to the products or services properly denominated by the marks to the extent that such trademark rights may exist). Two types of hypervisors that exist in today's computing environments are Type 1 and Type 2 hypervisors. A Type 1 hypervisor is installed directly on a host computer's hardware to control the hardware of the host computer and to manage all guest operating systems. A Type 2 hypervisor can support guest virtual machines by coordinating calls for CPU, memory, disk, network and other resources through the physical host's operating system.

Paravirtualization is a virtualization technique that provides a software interface to virtual machines that is similar to the underlying hardware-software interface. The provided software interface reduces execution times that a guest operating system can spend performing operations which are substantially more difficult to run in a virtual environment compared to a non-virtualized environment.

SUMMARY

Embodiments of the present invention disclose a method, computer program product, and system for accessing non-functional host capabilities and services of a host operating system, by a guest operating system. The method includes a hypervisor, of a host OS, intercepting a hardware instruction from a guest operating system, wherein the hardware instruction is associated with data located in a register and in memory that is accessible by the hypervisor. The method further includes analyzing the hardware instruction and data to determine if the hardware instruction is a non-functional service request. The method further includes, upon determining that the hardware instruction is a non-functional service request, executing the related non-functional service request and writing a response to the associated memory. The method further includes notifying the guest operating system that the execution of the non-functional service request is complete and the response is available.

BRIEF DESCRIPTION OF THE DRAWINGS

FIGS. 6A through 6C illustrate a control block, on a server within the virtual operating system environment of FIG. 3, for requesting non-functional host capabilities and services on a guest operating system, in an embodiment in accordance with the present invention.

DETAILED DESCRIPTION

Figure 1:
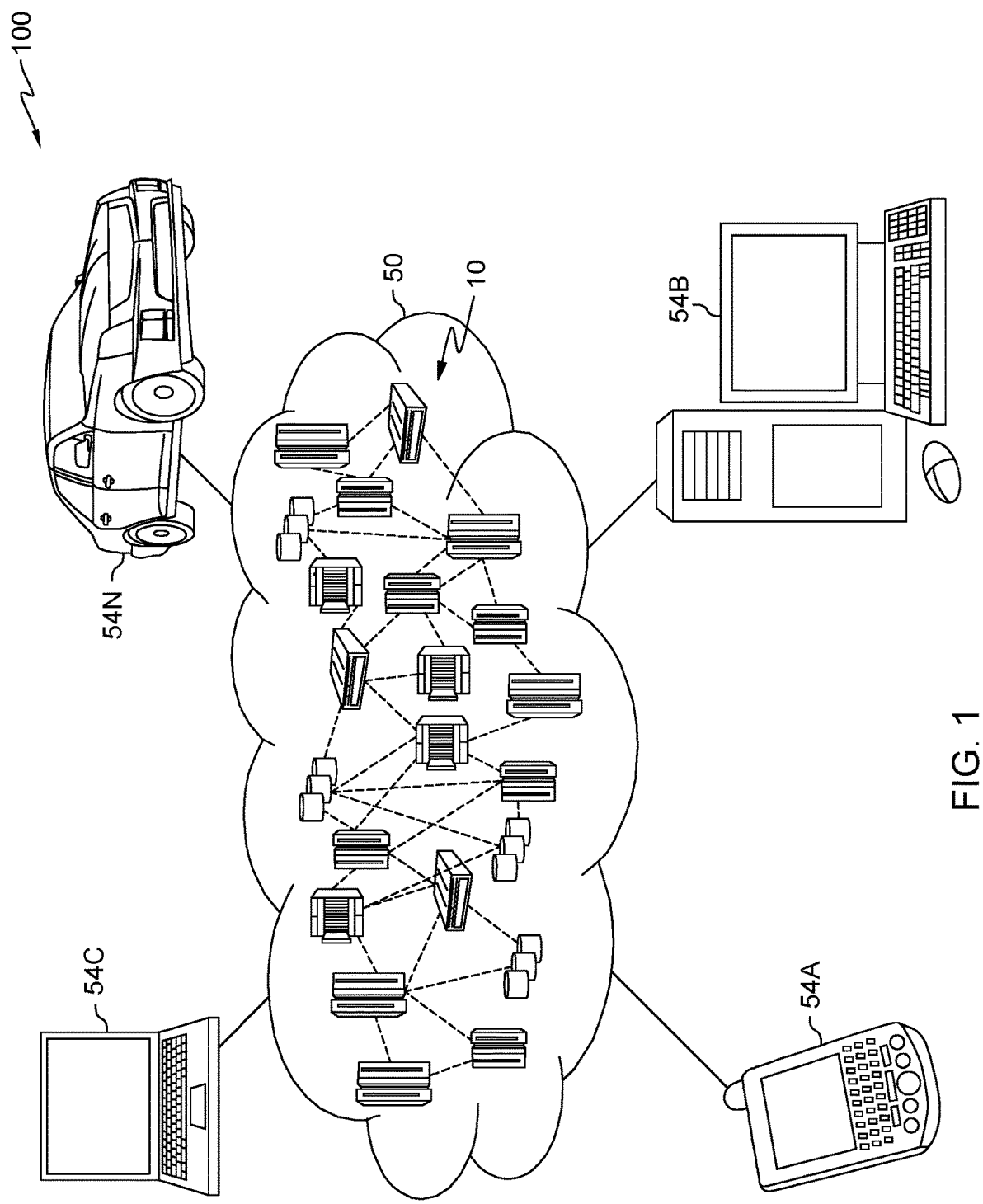
FIG. 1 depicts a cloud computing environment according to an embodiment of the present invention.

Embodiments in accordance with the present invention recognize that typical backbone and legacy applications may run on IBM z/OS for security and long-term compatibility (Note: the terms "IBM" and "z/OS" may be subject to trademark rights in various jurisdictions throughout the world and are used herein only in reference to the products or services properly denominated by the marks to the extent that such trademark rights may exist). Whenever new applications are typically written, they tend to be developed first for Linux as it is an open and community-supported environment. Hypervisor techniques such as implementing a type 2 hypervisor can allow running Linux on top of z/OS, enabling applications for Linux to be deployed implicitly on z/OS. Type 2 hypervisors support guest virtual machines by coordinating calls for CPU, memory, disk, network and other resources through the physical host's operating system. This enables an end user to execute a virtual machine on a personal computing device. Such type 2 hypervisor techniques are widely used and aim at running otherwise incompatible applications in the virtual guest operating system (OS) while the host acts as a runtime environment. Hence, system functionality may be duplicated in the virtual guest OS and managed in multiple places, e.g., access control/security. Moreover, important information such as detailed logging of processes within the virtual guest OS may be unavailable to the host OS. Such detailed information on application or process level have been used in z/OS environments for pricing and billing purposes.

Embodiments of the present invention provide a method for a guest OS to be managed by its host OS and enable the guest OS to use non-functional host capabilities and services of the host OS. The method can extend the interface between the guest and host OS and provide an application program interface (API) for host services to the guest. In many embodiments, the use of this API is optional and allows traditional OS guests to be run as well. Furthermore, these embodiments are not limited to specific operating systems for the guest or host operating systems. A benefit of the embodiments discussed herein is that the services and non-functional properties (such as security) from a host OS can be exploited within a guest OS. Furthermore, the guest OS may be minimalistic while focusing on compatibility to run applications, for example, and deferring enhanced/managing functionality to the host.

Embodiments in accordance with the present invention will now be described in detail with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, generally designated 100, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
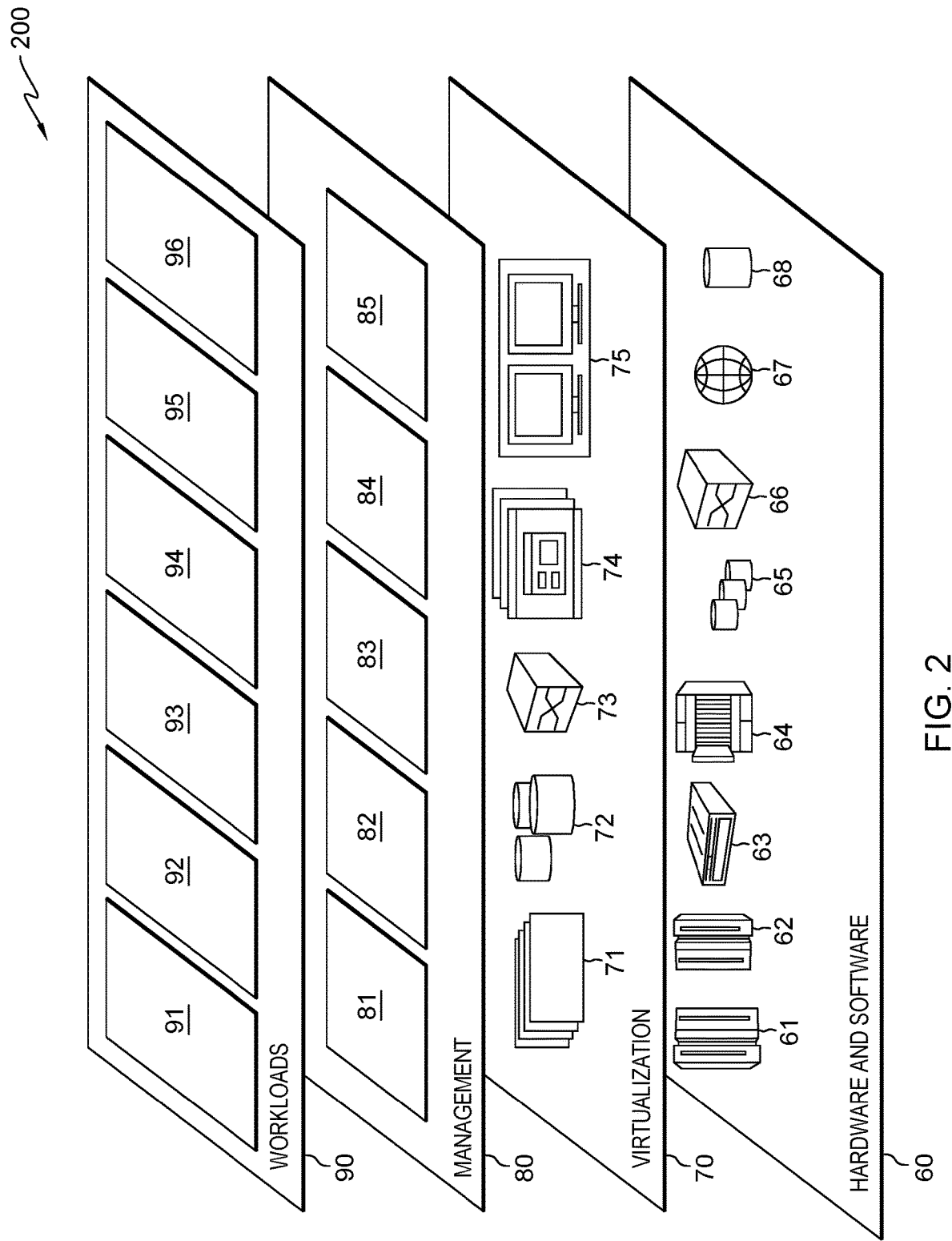
FIG. 2 depicts abstraction model layers according to an embodiment of the present invention.

Referring now to FIG. 2, generally designated 200, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application 96 which can request non-functional services of a host operating system.

Figure 3:
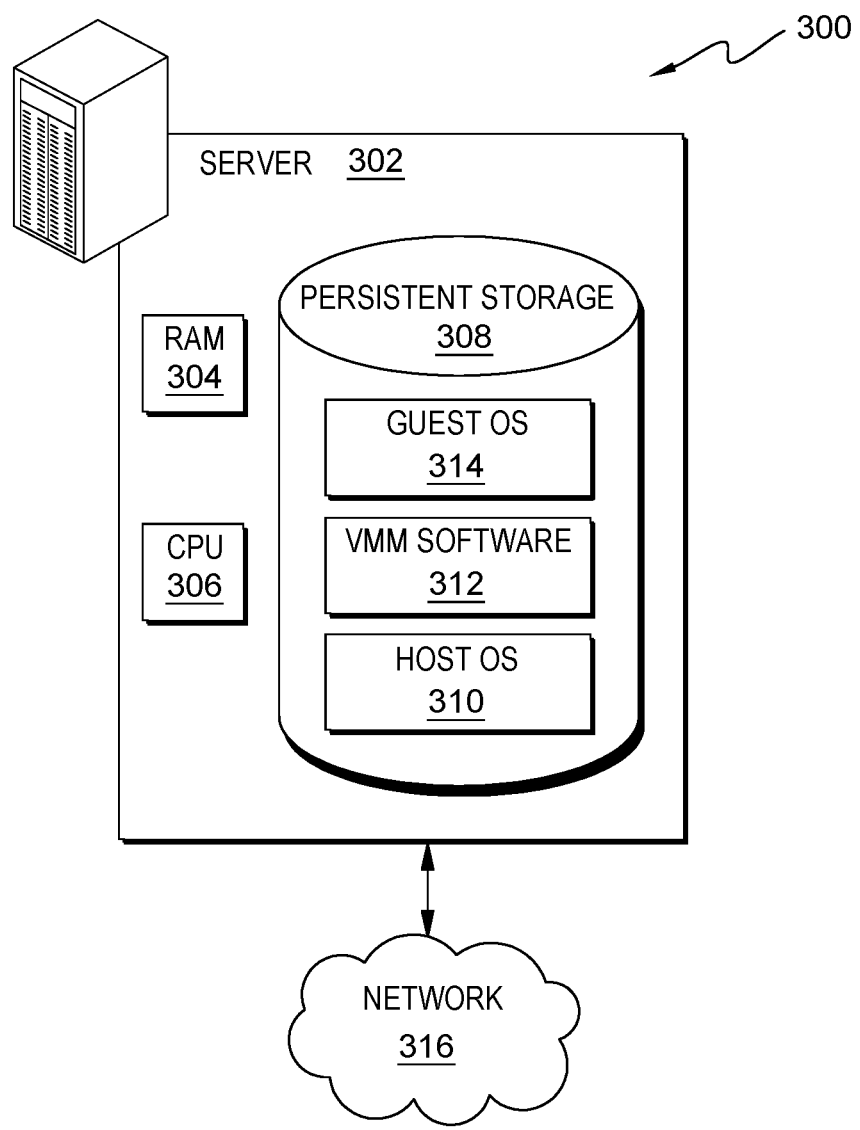
FIG. 3 is a functional block diagram illustrating a virtual operating system environment, in an embodiment in accordance with the present invention.

FIG. 3 is a functional block diagram, generally designated 300, illustrating a virtual operating system environment, in an embodiment in accordance with the present invention.

Virtual operating system environment 300 includes server 302 and other computing devices (not shown), all interconnected over network 316. Server 302 includes random access memory (RAM) 304, central processing unit (CPU) 306, and persistent storage 308. Server 302 may be a Web server, or any other electronic device or computing system, capable of processing program instructions and receiving and sending data. In some embodiments, server 302 may be a laptop computer, a tablet computer, a netbook computer, a personal computer (PC), a desktop computer, a personal digital assistant (PDA), a smart phone, or any programmable electronic device capable of communicating over a data connection to network 316. In other embodiments, server 302 may represent server computing systems utilizing multiple computers as a server system, such as in a distributed computing environment. In general, server 302 is representative of any electronic device or combinations of electronic devices capable of executing machine-readable program instructions and communicating with other computing devices (not shown), via network 316 within virtual operating system environment 300.

Server 302 includes persistent storage 308. Persistent storage 308 may, for example, be a hard disk drive. Alternatively, or in addition to a magnetic hard disk drive, persistent storage 308 may include a solid state hard drive, a semiconductor storage device, read-only memory (ROM), erasable programmable read-only memory (EPROM), flash memory, or any other computer-readable storage medium that is capable of storing program instructions or digital information. Server 302 may include internal and external hardware components, as depicted and described in further detail with respect to FIG. 11.

Host operating system (OS) 310, virtual machine monitor (VMM) 312, and guest OS 314 are stored in persistent storage 308, which also includes operating system software (not shown), as well as software that enables server 302 to communicate with other computing devices (not shown) of virtual operating system environment 300 over a data connection on network 316.

Host OS 310 includes computer programs, or sets of computer programs, that are stored in persistent storage 308. Host OS 310 enables a user of server 302 to execute (e.g., run as a process), one or more guest operating systems, such as guest OS 314, using VMM software 312. In one example embodiment, host OS 310 is contained in hardware and software layer 60.

VMM software 312 includes computer programs, or sets of computer programs, that are stored in persistent storage 308. VMM software 312 is an application that executes on host OS 310 and enables a user of server 302 to execute one or more guest virtual machines (e.g., guest OS 314), by coordinating calls for CPU, memory, disk, network and other resources through host OS 310. In one example embodiment, VMM software 312 is contained in virtualization layer 70.

Guest OS 314 includes computer programs, or sets of computer programs, that are stored in persistent storage 308. Guest OS 314 is an application environment that is installed on VMM software 312 which imitates dedicated hardware. A user of guest OS 314 has the same operating experience as he or she would have on dedicated hardware. In one example embodiment, guest OS is contained in management layer 80.

In one example embodiment, a computer system uses a start interpretive execution (SIE) facility, known in the art, within a type 2 hypervisor (e.g., VMM software 312), to support and optimize the performance of one or more virtual machines by providing a way for the virtual machine processor to execute functions, with the exception of I/O requests, in hardware. The general idea is that first control is passed to hardware over a SIE instruction and then interrupts that cannot be handled in the guest OS 314 hardware are to be handled by the hypervisor (e.g., virtual machine monitor software 312). In one example embodiment, VMM software 312 uses paravirtualization, thus providing an interface to guest OS 314 that is similar but not identical to a hardware interface (for example, a virtual input/output (VirtIO) API for native hardware resources such as I/O devices). In such an environment, guest OS 314 requests can be handled with special DIAGNOSE codes (e.g., hardware instruction), that call one or more APIs to support the guest OS 314 hardware resource requests more efficiently.

In FIG. 3, network 316 is shown as the interconnecting fabric between server 302, and with various components and devices (not shown) within virtual operating system environment 300. In practice, the connection may be any viable data transport network, such as, for example, a LAN or WAN. Network 316 can be for example, a local area network (LAN), a wide area network (WAN) such as the Internet, or a combination of the two, and include wired, wireless, or fiber optic connections. In general, network 316 can be any combination of connections and protocols that will support communications between server 302 and with various components and devices (not shown) within virtual operating system environment 300.

Figure 4:
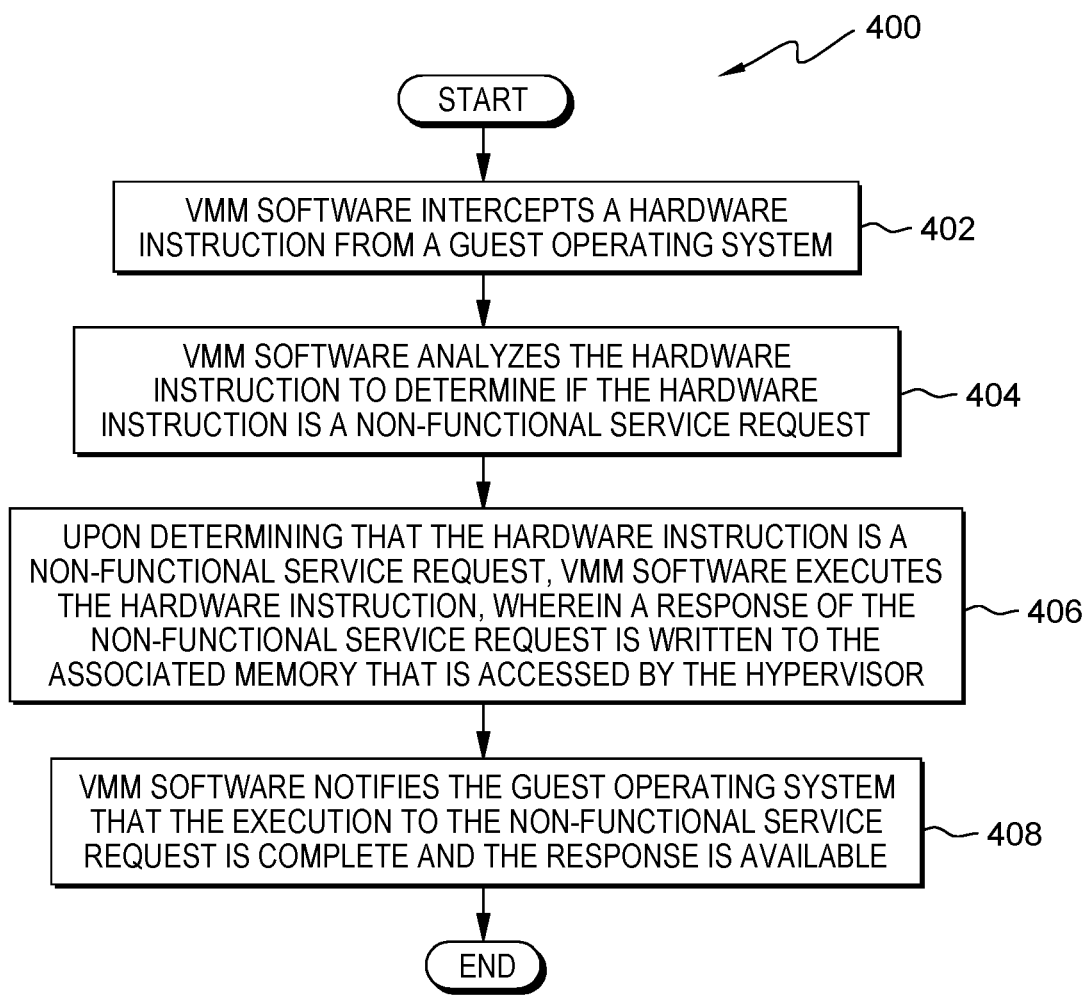
FIG. 4 is a flowchart depicting operational steps of a virtual machine monitor software, on a server within the virtual operating system environment of FIG. 3, for providing non-functional host capabilities and services to a guest operating system, in an embodiment in accordance with the present invention.

FIG. 4 is a flowchart, generally designated 400, depicting operational steps of a virtual machine monitor software, on a server within the virtual operating system environment of FIG. 3, for providing non-functional host capabilities and services to a guest operating system, in an embodiment in accordance with the present invention. In one example embodiment, host OS 310 on server 302 is hosting guest OS 314 via VMM software 312. A software application executing on guest OS 314 uses an authentication mechanism of host OS 310, for example a security system that provides access control and auditing functionality. Embodiments of the present invention provide an API within guest OS 314 that enable guest OS 314 to request the non-functional host capabilities and services of host OS 310, such as the security system that provides access control and auditing functionality. Stated another way, a non-functional service request is a request for a service that guest OS 314 does not have access to on host OS 310. In other example embodiments, a software application executing on guest OS 314 uses application-level logging and event recording of host OS 310, for example a system management facility that can provide records for pricing and auditing purposes.

VMM software 312 intercepts a hardware instruction from a guest operating system as depicted in step 402. For example, an application executing on guest OS 314 issues a request (e.g., a DIAGNOSE code, also referred to as a DIAGNOSE instruction), for authorization information using a provided API, also referred to as GuestHostAPI (GHAPI), and passes a function code, user identification (userID), and a resource for the authorization check. VMM software 312 then receives the issued DIAGNOSE instruction from guest OS 314.

In step 404, VMM software 312 analyzes the hardware instruction to determine if the hardware instruction is a non-functional service request. For example, VMM software 312 determines that the DIAGNOSE instruction is for authorization information on host OS 310. VMM software 312 can extract the function code, userID, and a resource for the authorization check, wherein the function call identifies the requested operation (e.g., authorization information check), the userID identifies the user or application, and the resource identifies a memory location within guest OS 314 that VMM software 312 can write a returned result of the request to.

Upon determining that the hardware instruction is a non-functional service request, VMM software 312 executes the hardware instruction, wherein a response of the non-functional service request is written to the associated memory that is accessed by the hypervisor as depicted in step 406. For example, upon extracting, or determining, the function code, userID, and a resource for the authorization check, VMM software 312 can execute the determined, or extracted, non-functional service request (e.g., a function that can perform the authorization information check on host OS 310), and write the returned result (e.g., "Yes" or "No" regarding the authorization information check), to the identified resource of guest OS 314 (e.g., the memory location within guest OS 314).

In step 408, VMM software notifies the guest operating system that the execution to the non-functional service request is complete and the response is available. For example, VMM software 312 can issue an SIE hardware instruction to give guest OS 314 control after the DIAGNOSE instruction, wherein the guest OS 314 can then analyze the returned result in the shared memory location.

Figure 5A:
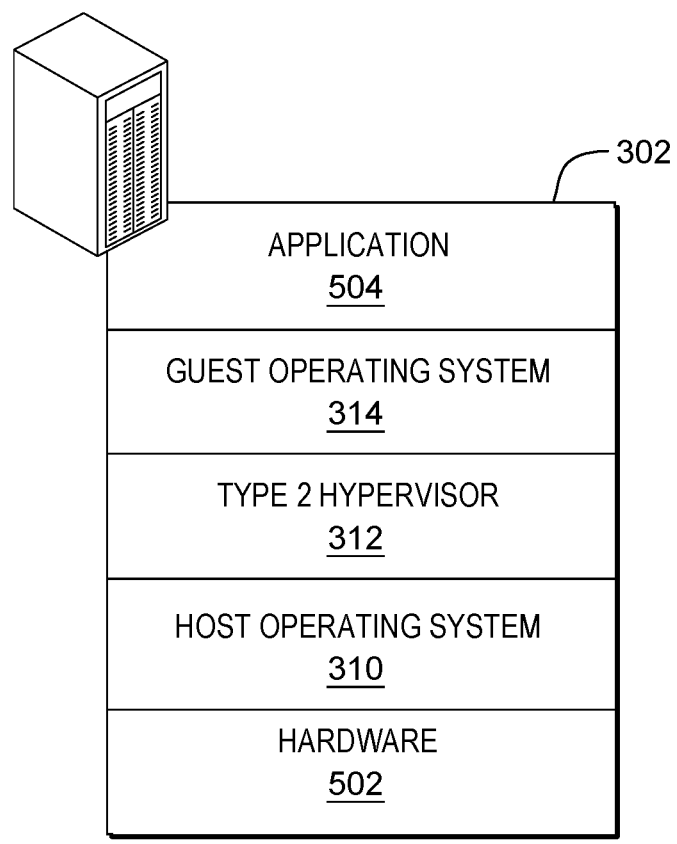
FIG. 5A illustrates the layers and components of hardware and virtualization, on a server within the virtual operating system environment of FIG. 3, for providing non-functional host capabilities and services to a guest operating system, in an embodiment in accordance with the present invention.

FIG. 5A illustrates the layers and components of hardware and virtualization, on a server within the virtual operating system environment of FIG. 3, for providing non-functional host capabilities and services to a guest operating system, in an embodiment in accordance with the present invention. It should be appreciated that the example embodiment of FIG. 5A provides only an illustration of one implementation and does not imply any limitations with regard to the environments in which different embodiments may be implemented. Many modifications to the depicted environment may be made.

Server 302 is comprised of several layers and components as depicted in FIG. 5A. The lowest layer is hardware layer 502. Hardware layer 502 is comprised of the physical components of server 302 that includes, RAM 304, CPU 306, and persistent storage 308 that are controlled and managed by host OS 310.

Host OS 310 executes on hardware layer 502 while executing VMM software 312 (e.g., Type 2 hypervisor 312), as an application. Guest OS 314 executes as an application on VMM software 312 and application 504 executes on guest OS 314. There can be many virtual machines executing on VMM software 312. In one example embodiment, application 504 is analogous to application 96.

Figure 5B:
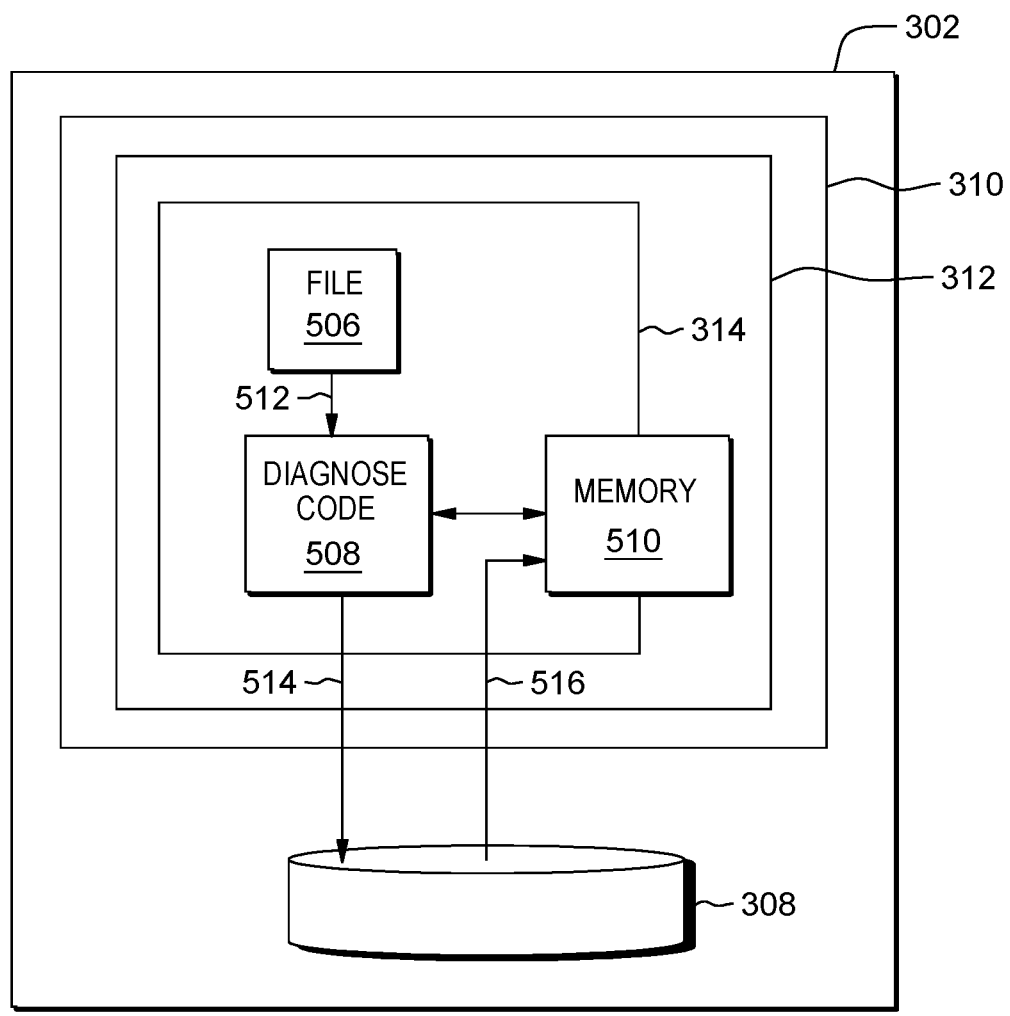
FIG. 5B illustrates an application executing within a guest operating system, on a server within the virtual operating system environment of FIG. 3, in an embodiment in accordance with the present invention.

FIG. 5B illustrates an application executing within a guest operating system, on a server within the virtual operating system environment of FIG. 3, in an embodiment in accordance with the present invention. Continuing the example embodiment of FIG. 4, the application executing on guest OS 314 issues a request (e.g., a DIAGNOSE code) for authorization information on host OS 310. Upon executing a call of the API, guest OS 314 issues a special DIAGNOSE interrupt that host OS 310 is able to handle using VMM software 312. For example, the DIAGNOSE request can request authentication or request logging for one or more applications executing on guest OS 314. Data exchange and guest/host communication is carried out using shared memory (e.g., memory 510), as VMM software 312 and guest OS 314 execute on the same host OS (e.g., host OS 310). Memory 510 is described in further detail with respect to FIGS. 6A through 6C.

FIG. 5B further shows an example when running applications within guest OS 314. For example, a containerized application (not shown) can be configured using file 506. When a configuration or a start of the containerized application is triggered, as indicated by reference 512, DIAGNOSE code 508 is issued and caught from the underlying VMM software 312, as indicated by reference 514, wherein DIAGNOSE code 508 is associated with data within memory 510 and can be read by VMM software 312. Depending on an identified type of a request for DIAGNOSE code 508, simple log records can be written to log the process of the containerized application within guest OS 314, wherein the simple log records are stored in persistent storage 308. Additionally, for request that require a response, such as authentication requests to system authorization facility, VMM software 312 can execute one or more APIs of host OS 310. Upon receiving a returned response to the one or more APIs of host OS 310, VMM software 312 writes, or stores, the response of host OS 310 to the appropriate part of memory 510, as indicated by reference 516, that guest OS 314 can access. Upon writing the response of host OS 310, VMM software 312 signals guest OS 314 to continue its processing, wherein guest OS 314 can analyze the response within memory 510 to decide how to continue.

FIGS. 6A through 6C illustrate a control block, on a server within the virtual operating system environment of FIG. 3, for requesting non-functional host capabilities and services on a guest operating system, in an embodiment in accordance with the present invention. Referring to the example embodiment of FIG. 6A, and continuing the example embodiment of FIG. 5B, guest OS 314 issues a special DIAGNOSE interrupt that host OS 310 is able to handle using VMM software 312. For example, upon extracting the function code, userID, and a resource for the authorization check, VMM software 312 allocates control block 602, also referred to as a Get Host API Parameter List (GHAPIPL), or parameter control block, in memory 510, wherein the control block 602 is used to indicate, and store a returned result, of the requested non-functional host capabilities and services of host OS 310. Control block 602 contains GhEyeCatcher 604 (i.e., an eye catcher identifying control block 602), GhVersion 606 (i.e., a version indicator for the requested function), GhLength 608 (i.e., a total length of control block 602), GhFunction 610 (i.e., the requested function by the application executing on guest OS 314), GhDataLen 612 (i.e., a length of additional control information and the returned result), and GhData 614 (i.e., a location of the returned result).

In one example embodiment, wherein the requested function by the application executing on guest OS 314 is for non-functional host capabilities and services of host OS 310, GhData 614 can include authentication specific data, which includes and one or more returned results as depicted in FIG. 6B. For example, GhData 614 can contain GhAuthResult 616 (i.e., a return code of the authorization check), GhUserIdLength 618 (i.e., a length of the userID), GhEyeCatcher 620 (i.e., an eye catcher that identifies the authentication specific portion of control block 602), GhResourceLength 622 (i.e., a length or size of the resource to be accessed), and GhResource 624 (i.e., the resource to be accessed).

In another example embodiment, where the requested function by the application executing on guest OS 314 is to provide logging information relating to the progress on the application executing on guest OS 314, GhData 614 can include logging specific data as depicted in FIG. 6C. For example, GhData 614 can contain GhApplication 626 (i.e., an application name and/or function), GhApplVersion 628 (i.e., a version number of the application), GhApplStartTime 630 (i.e., a time of day the logged event occurred), and GhApplStopTime 632 (i.e., a time of day the logged event ended).

Figure 7:
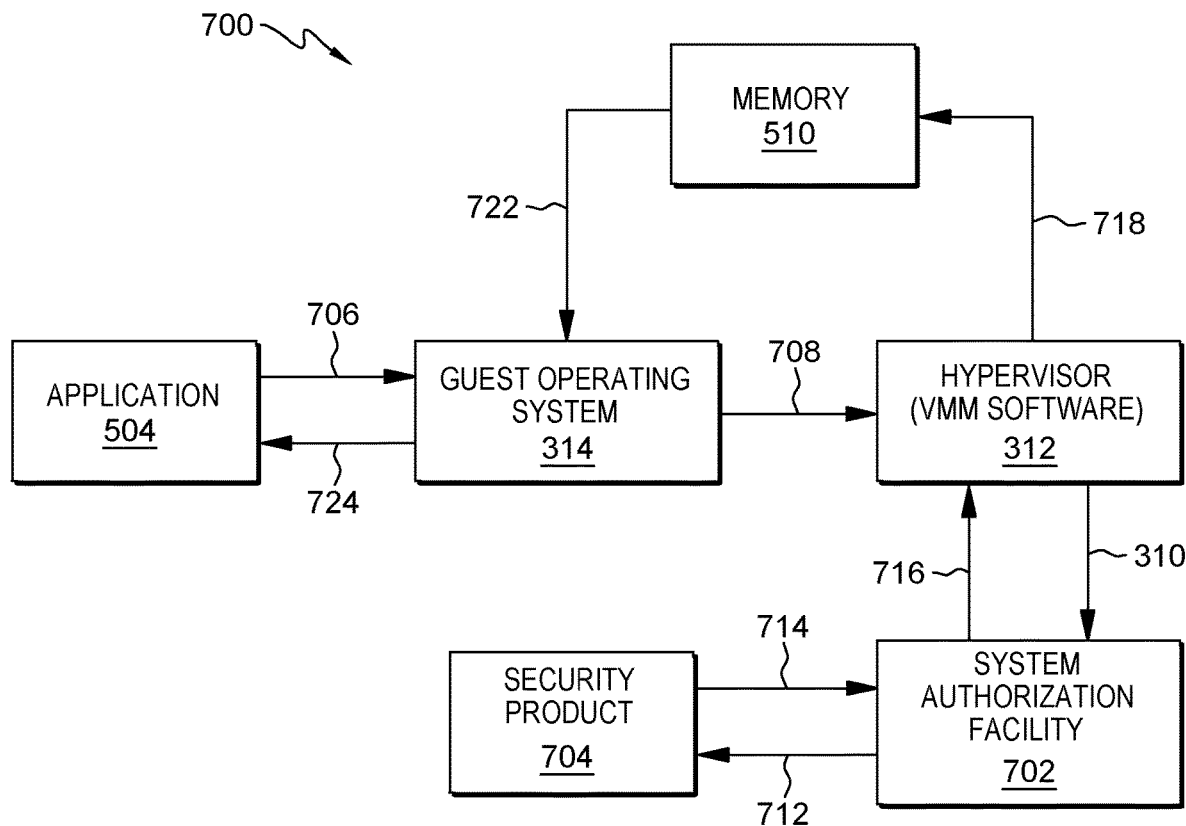
FIG. 7 illustrates a flow control diagram, on a server within the virtual operating system environment of FIG. 3, of an application executing an authentication request, in an embodiment in accordance with the present invention.
Figure 8:
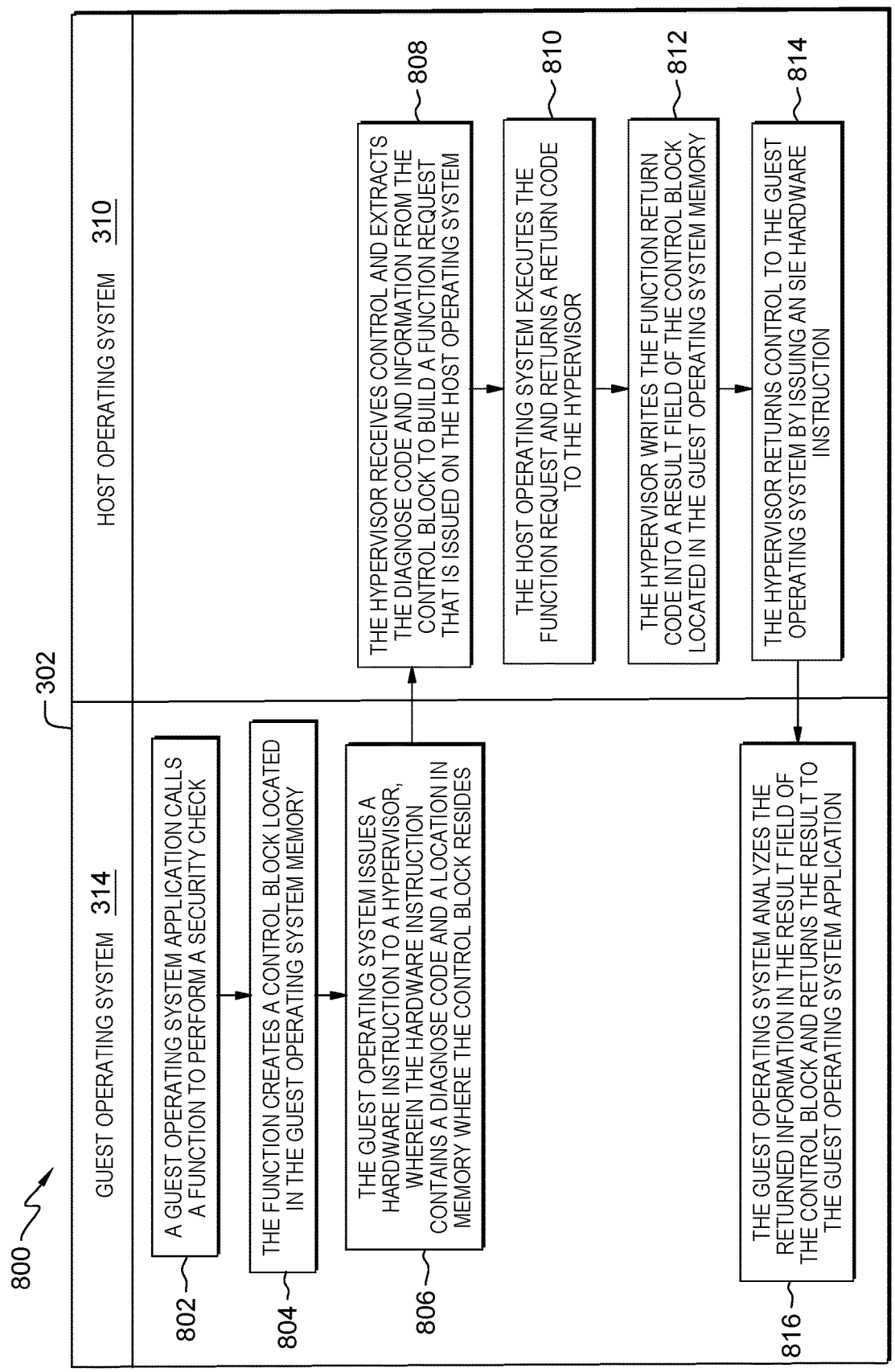
FIG. 8 is a flowchart depicting operational steps of a virtual machine monitor software, on a server within the virtual operating system environment of FIG. 3, for executing an authentication request of an application on a guest operating system, in an embodiment in accordance with the present invention.

FIG. 7 illustrates a flow control diagram, generally designated 700, on a server within the virtual operating system environment of FIG. 3, of an application executing an authentication request, in an embodiment in accordance with the present invention. FIG. 8 is a flowchart, generally designated 800, depicting operational steps of a virtual machine monitor software, on a server within the virtual operating system environment of FIG. 3, for executing an authentication request of an application on a guest operating system, in an embodiment in accordance with the present invention. FIG. 8 will be discussed with respect to the example embodiment of FIG. 7, wherein application 504 executing on guest OS 314 issues a request (e.g., a DIAGNOSE code), for authorization information on host OS 310.

A guest operating system application calls a function to perform a security check as depicted in step 802. For example, application 504 issues a request, or function call, for authorization information on guest OS 314 using an API, also referred to as GuestHostAPI (GHAPI), and passes a function code, user identification (userID), and a resource for the authorization check as indicated by reference indicator 706.

In step 804, the function creates a control block located in the guest operating system memory. For example, GHAPI allocates control block 602 in memory 510 and initializes, or writes, the passed-in parameters by application 504. For example, GHAPI identifies control block 602 by initializing GhEyeCatcher 604 with data that can identify control block 602 within memory 510. GHAPI can then populate GhVersion 606 to indicate a desired version for the requested function, GhLength 608 (i.e., a total length of control block 602), GhFunction 610 with the passed in function code from application 504, GhDataLen 612 with the length of additional control information and the returned result), and GhData 614 which contains additional control information and the returned result. As described in relation to FIG. 6B, GhData 614 contains GhUserIdLength 618 which is the length of the userID, GhResourceLength 622 with the length or size of the resource to be accessed, and GhResource 624 with the resource to be accessed.

The guest operating system 314 issues a hardware instruction to a hypervisor, wherein the hardware instruction contains a DIAGNOSE code and a location in memory where the allocated control block resides as depicted in step 806. For example, upon allocating and initializing control block 602, guest OS 314 issues a hardware instruction that contains a DIAGNOSE code as indicated by reference indicator 708, wherein guest OS 314 sets the DIAGNOSE code to be the passed-in function that was requested by application 504. In this case, the passed-in function is the GHAPIPL (e.g., control block 602), which contains GhFunction 610 that indicates the requested function.

In step 808, the hypervisor receives control and extracts the DIAGNOSE code and information from the control block to build a function request that is issued on the host operating system. For example, VMM software 312 receives control by intercepting the hardware instruction and analyzing the DIAGNOSE code to determine if the request is for a non-functional service of host OS 310. Upon extracting the information (e.g., the function code, user identification (userID), and a resource for the authorization check), from control block 602 (e.g., GHAPIPL 602), VMM software 312 can build an authorization request for system authorization facility 702 to determine if the passed-in userID (e.g., GhUserIdLength 614), is permitted to access the passed-in resource (e.g., GhResource 624), as indicated by reference indicator 710.

The host operating system executes the function request and returns a return code to the hypervisor as depicted in step 810. For example, system authorization facility 702 issues the authorization request to security product 704 as indicated by reference indicator 712. Upon receiving the authorization request, security product 704 determines whether the passed-in userID (e.g., GhUserIdLength 618) is authorized to access the passed-in resource (e.g., GhResource 624), and returns a result back to system authorization facility 702 as indicated by reference indicator 714.

In step 812, the hypervisor writes the function return code into a result field of the control block located in the guest operating system memory. For example, upon receiving the returned result from security product 704, system authorization facility 702 returns the result (e.g., RC=0 allowed, RC=8 not allowed), back to VMM software 312 as indicated by reference indicator 716. VMM software 312 then writes the returned result into GhAuthResult 416 of control block 602 in memory 510 as indicated by reference indicator 718.

The hypervisor returns control to the guest operating system by issuing an SIE hardware instruction as depicted in step 814. For example, VMM software 312 ends the intercepted hardware instruction by issuing an SIE hardware instruction to guest OS 314 through memory 510 as indicated by reference indicator 720, therefore returning control back to guest OS 314. In other example embodiments, the SIE hardware instruction can be comprised of setting a bit in memory 510 that guest OS 314 can monitor. Upon detecting that the bit has been set by VMM software 312, guest OS 314 can resume processing of the returned authorization result.

In step 816, the guest operating system analyzes the returned information in the result field of the control block and returns the result to the guest operating system application. For example, guest OS 314 receives control after the DIAGNOSE instruction processing and analyzes the returned result in GhAuthResult 616 as indicated by reference indicator 722. Upon analysis of control block 602, guest OS 314 copies GhAuthResult 616 into a return code, or parameter, of the function call that application 504 executed in step 802, as indicated by reference indicator 724.

Figure 9:
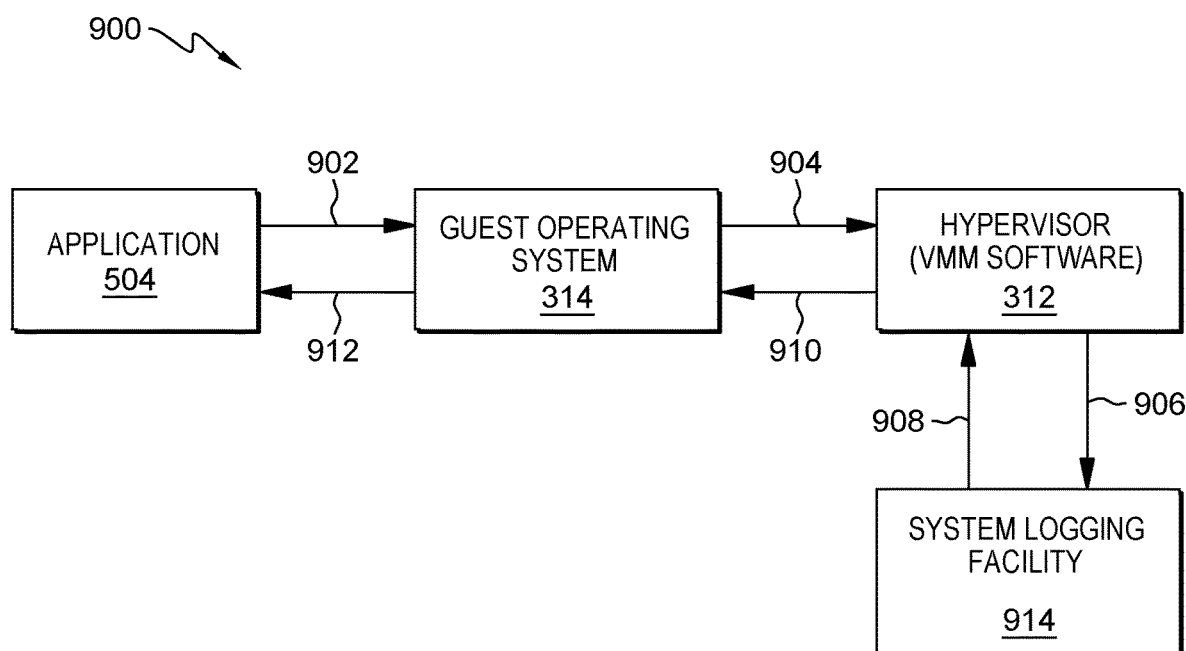
FIG. 9 illustrates a flow control diagram, on a server within the virtual operating system environment of FIG. 3, of an application executing a logging request, in an embodiment in accordance with the present invention.
Figure 10:
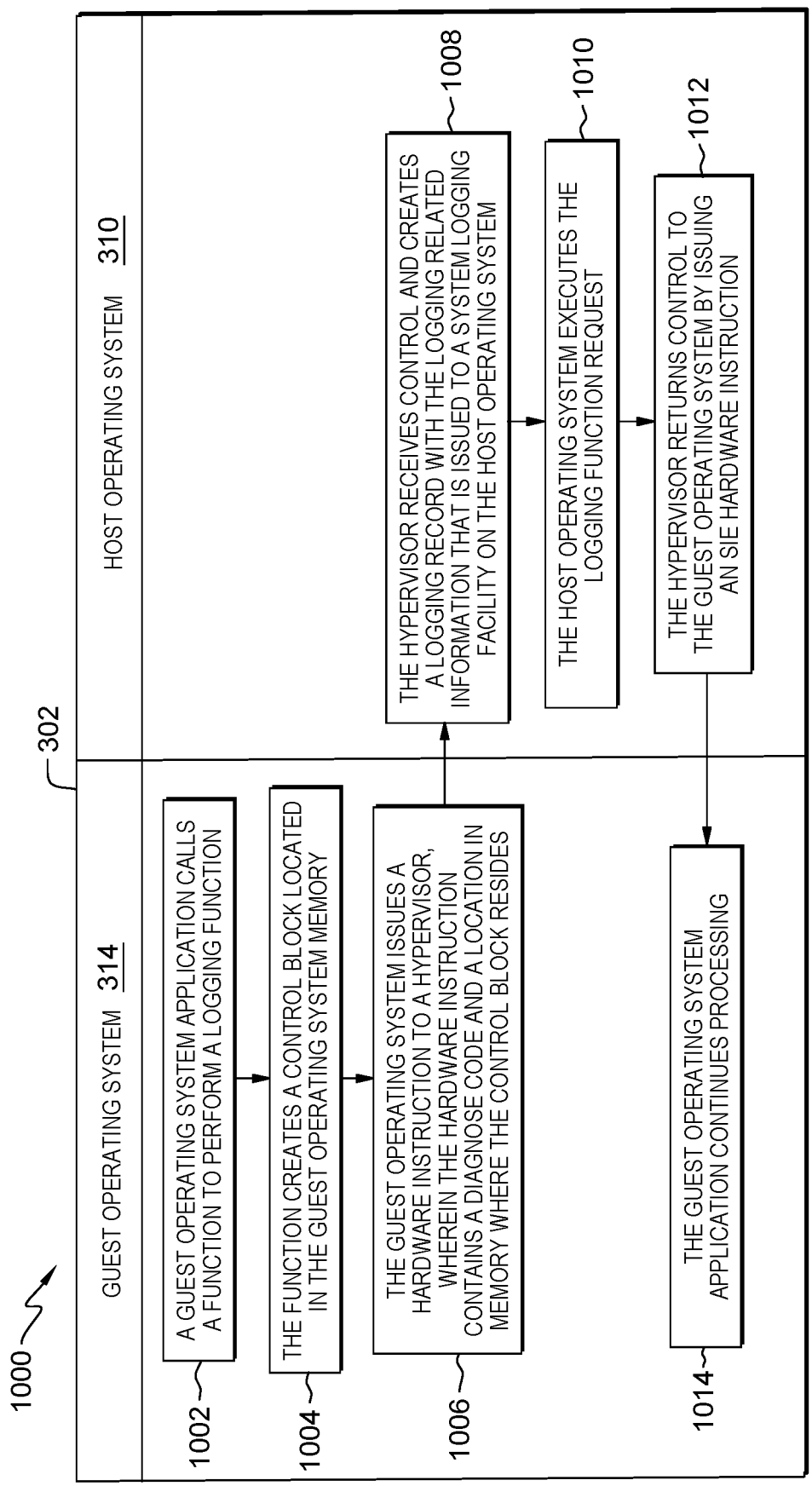
FIG. 10 is a flowchart depicting operational steps of a virtual machine monitor software, on a server within the virtual operating system environment of FIG. 3, for executing a logging request of an application on a guest operating system, in an embodiment in accordance with the present invention.

FIG. 9 illustrates a flow control diagram, generally designated 900, on a server within the virtual operating system environment of FIG. 3, of an application executing a logging request, in an embodiment in accordance with the present invention. FIG. 10 is a flowchart, generally designated 1000, depicting operational steps of a virtual machine monitor software, on a server within the virtual operating system environment of FIG. 3, for executing a logging request of an application on a guest operating system, in an embodiment in accordance with the present invention. FIG. 10 will be discussed with respect to the example embodiment of FIG. 9, wherein application 504 executing on guest OS 314 issues a request (e.g., a DIAGNOSE code), for logging information relating to an executing process on host OS 310. In one example embodiment, information relating to an application delivery software (e.g., application 504), within guest OS 314 is logged into host OS 310. For example, a configuration file of a web application comprised of two containers, a database and a web-based application that depends on the database. Using an application 504 command toolset, application 504 can be set up, or configured, as one or more container images are downloaded from a central library. In this case, the guest may trap into the host to signal this event. For example, event data of application 504 can then be logged into log files for auditing and pricing purposes. In one example embodiment, this can be accomplished by modifying the execve method of a Linux guest operating system (e.g., guest OS 314), and then loading this overloaded method, or simply replacing it, in the Linux guest operating system source.

A guest operating system application calls a function to perform a logging function as depicted in step 1002. For example, application 504 issues a request, or function call, for logging information related to application 504 on guest OS 314 using GHAPI and passes a function code and logging information (e.g., data to be logged on host OS 310), as indicated by reference indicator 902.

In step 1004, the function creates a control block located in the guest operating system memory. For example, GHAPI allocates control block 602 in memory 510 and initializes, or writes, the passed in parameters by application 504. For example, GHAPI identifies control block 602 by initializing GhEyeCatcher 604 with data that can identify control block 602 within memory 510. GHAPI can then populate GhVersion 606 to indicate a desired version for the requested function (e.g., a logging utility), GhLength 608 (i.e., a total length of control block 602), GhFunction 610 with the passed in function code from application 504, GhDataLen 612 with the length of the data to be logged, and GhData 614 with additional logging data. As described in relation to FIG. 6C, GhData 614 contains GhApplication 626 which is the name of the executing application, GhApplVersion 628 with the version of the executing application, GhApplStartTime 630 with a time of day that the event occurred, and GhApplStopTime 632 with a time of day that the event ended.

The guest operating system 314 issues a hardware instruction to a hypervisor, wherein the hardware instruction contains a DIAGNOSE code and a location in memory where the control block resides as depicted in step 1006. For example, upon allocating and initializing control block 602, guest OS 314 issues a hardware instruction that contains a DIAGNOSE code as indicated by reference indicator 904, wherein guest OS 314 sets the DIAGNOSE code to be the passed-in function that was requested by application 504. In this case, the passed-in function is the GHAPIPL (e.g., control block 602), which contains GhFunction 610 that indicates the requested function (e.g., logging function).

In step 1008, the hypervisor receives control and creates a logging record with the logging related information that is issued to a system logging facility on the host operating system. For example, VMM software 312 analyzes the DIAGNOSE code to determine if the request is for a logging function of host OS 310. Upon extracting the information (e.g., the function code and logging information), from control block 602 (e.g., GHAPIPL 602), VMM software 312 can build a log request for system logging facility 914 to execute, as indicated by reference indicator 906.

The host operating system executes the logging function request as depicted in step 1010. For example, system logging facility 914 logs the passed-in event data of application 504 on guest OS 314 and returns processing back to VMM software 312 as indicated by reference indicator 908.

In step 1012, the hypervisor returns control to the guest operating system. For example, VMM software 312 ends the processing of the logging request and returns processing back to guest OS 314 as indicated by reference indicator 910.

The guest operating system application continues processing as depicted in step 1014. For example, guest OS 314 receives control after the DIAGNOSE instruction processing and returns processing back to application 504 as indicated by reference indicator 912.

Embodiments of the present invention disclose a method for a guest operating system to be managed by a host operating system and enable the guest operating system to use non-functional host capabilities and services of the host operating system. The method includes receiving a function code and additional data from an application of a guest operating system, wherein the function code is a non-functional service request on a host operating system, and wherein the non-functional service request is a request for a service that the guest operating system does not have access to. The method further includes creating a parameter control block using the function code and the additional data in a register and in memory of the guest operating system, wherein the register and memory of the guest operating system are accessible by a hypervisor of the host operating system. The method further includes issuing a hardware instruction by the guest operating system, wherein, in response to the issuing of the hardware instruction, the hypervisor of the host operating system receives control, and wherein the hardware instruction is associated with the data located in the register and in memory that is accessible by the hypervisor. The method further includes receiving a notification from the hypervisor that the execution of the non-functional service request is complete and analyzing a returned result located in the parameter control block in the register and in memory of the guest operating system for a determination of a next processing step.

Figure 11:
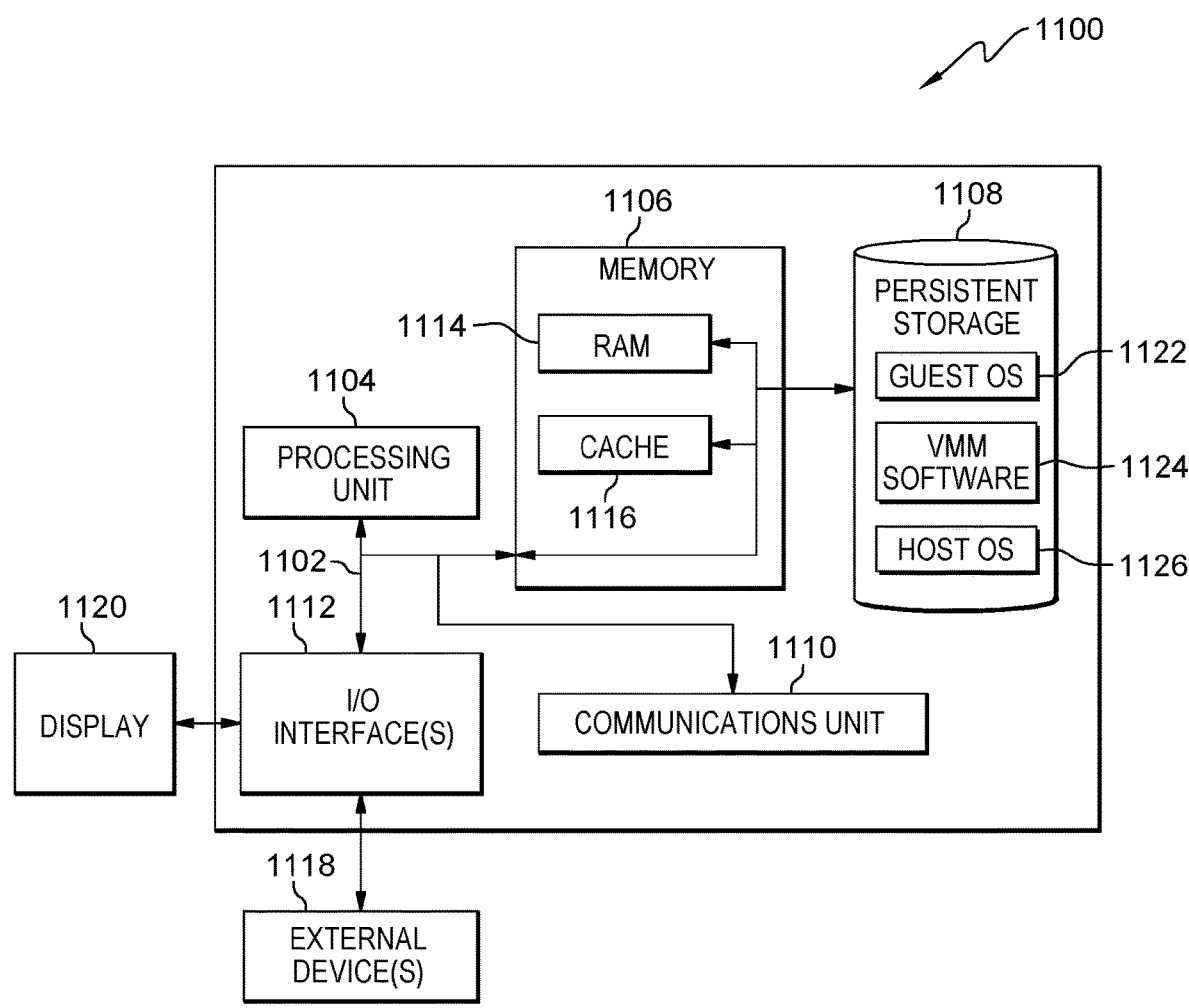
FIG. 11 depicts a block diagram of components of the server computer executing the virtual machine monitor software, in an embodiment in accordance with the present invention.

FIG. 11 depicts a block diagram, generally designated 1100, of components of the server computer executing the virtual machine monitor software, in an embodiment in accordance with the present invention. It should be appreciated that FIG. 11 provides only an illustration of one implementation and does not imply any limitations with regard to the environments in which different embodiments may be implemented. Many modifications to the depicted environment may be made.

Server 302 includes communications fabric 1102, which provides communications between computer processor(s) 1104, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses.

Memory 1106 and persistent storage 1108 are computer readable storage media. In this embodiment, memory 1106 includes random access memory (RAM) 1114 and cache memory 1116. In general, memory 1106 can include any suitable volatile or non-volatile computer readable storage media.

Host operating system 1126, virtual machine monitor software 1124, and guest operating system 1122 are stored in persistent storage 1108 for execution by one or more of the respective computer processors 1104 via one or more memories of memory 1106. In this embodiment, persistent storage 1108 includes a magnetic hard disk drive. Alternatively, or in addition to a magnetic hard disk drive, persistent storage 1108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

Communications unit 1110, in these examples, provides for communications with other data processing systems or devices, including resources of network 316. In these examples, communications unit 1110 includes one or more network interface cards. Communications unit 1110 may provide communications through the use of either or both physical and wireless communications links. Host operating system 1126, virtual machine monitor software 1124, and guest operating system 1122 may be downloaded to persistent storage 1108 through communications unit 1110.

I/O interface(s) 1112 allows for input and output of data with other devices that may be connected to server 302. For example, I/O interface 1112 may provide a connection to external devices 1118 such as a keyboard, keypad, a touch screen, and/or some other suitable input device. External devices 1118 can also include portable computer readable storage media such as, for example, thumb drives, portable optical or magnetic disks, and memory cards. Software and data used to practice embodiments of the present invention, e.g., host operating system 1126, virtual machine monitor software 1124, and guest operating system 1126, can be stored on such portable computer readable storage media and can be loaded onto persistent storage 1108 via I/O interface(s) 1112. I/O interface(s) 1112 also connect to a display 1120.

Display 1120 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at least more than one item; there must exist at least two items, but there can also be three, four, or more items.

"Includes" and any variants (e.g., including, include, etc.) means, unless explicitly noted otherwise, "includes, but is not necessarily limited to."

The terms "receive," "provide," "send," "input," and "output" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

These terms, while difficult to precisely define, are well understood by those skilled in the art.

What is claimed is:

1. A computer-implemented method comprising:
   intercepting, by one or more computer processors, a hardware instruction from a guest operating system, wherein a hypervisor of a host operating system receives control, and wherein the hardware instruction is associated with data located in a register and in memory that is accessible by the hypervisor;
   analyzing, by one or more computer processors, the hardware instruction and data to determine if the hardware instruction is a non-functional service request, wherein the nonfunctional service request is a request for a service that the guest operating system does not have access to;
   upon determining that the hardware instruction is a non-functional service request, executing, by one or more computer processors, the non-functional service request, wherein a response of the non-functional service request is written to the associated memory that is accessible by the hypervisor;
   executing, by one or more computer processors, an authorization information check using one or more parameters relating to a corresponding host service, wherein executing the authorization information check includes extracting a function code, a user identification (userID), and a resource for the authorization information check, and wherein the function code identifies a requested operation, the userID identifies a user, and the resource identifies a memory location within the guest operating system;
   writing, by one or more computer processors, an authorization information check result to a location in memory of the guest operating system, wherein the authorization information check result includes a return code; and
   notifying, by one or more computer processors, the guest operating system that the execution of the non-functional service request is complete and the response is available.

2. The computer-implemented method of claim 1, wherein performing a requested service of the host operating system further comprises:
   allocating, by one or more computer processors, a parameter list, wherein the parameter list contains a function code identifying a requested host function and function related data; and
   executing, by one or more computer processors, the requested host service using the allocated parameter list.

3. The computer-implemented method of claim 1, wherein notifying the guest operating system that the execution of the non-functional service request is complete and the response is available further comprises:
   receiving, by one or more computer processors, an output of the non-functional service request; and
   storing, by one or more computer processors, the output of non-functional service request in the associated memory.

4. The computer-implemented method of claim 3, wherein notifying the guest operating system that the execution of the non-functional service request is complete further comprises:
   returning, by one or more computer processors, execution back to the guest operating system for analysis of the output of the non-functional service request in the associated memory and determination of next processing steps based on the output.

5. The computer-implemented method of claim 1, wherein the hypervisor is a type 2 hypervisor.

6. A computer program product comprising:
   one or more computer readable storage media and program instructions stored on the one or more computer readable storage media, wherein the one or more computer readable storage media are not transitory signals per se, the program instructions comprising:
   program instructions to intercept a hardware instruction from a guest operating system, wherein a hypervisor of a host operating system receives control, and wherein the hardware instruction is associated with data located in a register and in memory that is accessible by the hypervisor;
   program instructions to analyze the hardware instruction and data to determine if the hardware instruction is a non-functional service request, wherein the non-functional service request is a request for a service that the guest operating system does not have access to;
   program instructions to, upon determining that the hardware instruction is a nonfunctional service request, execute the non-functional service request, wherein a response of the non-functional service request is written to the associated memory that is accessible by the hypervisor;
   program instructions to execute an authorization information check using one or more parameters relating to a corresponding host service, wherein executing the authorization information check includes extracting a function code, a user identification (userID), and a resource for the authorization information check, and wherein the function code identifies a requested operation, the userID identifies a user, and the resource identifies a memory location within the guest operating system;

program instructions to write an authorization information check result to a location in memory of the guest operating system, wherein the authorization information check result includes a return code; and program instructions to notify the guest operating system that the execution of the nonfunctional service request is complete and the response is available.

7. The computer program product of claim 6, wherein performing a requested service of the host operating system further comprises:

program instructions to allocate a parameter list, wherein the parameter list contains a function code identifying a requested host function and function related data; and program instructions to execute the requested host service using the allocated parameter list.

8. The computer program product of claim 6, wherein notifying the guest operating system that the execution of the non-functional service request is complete and the response is available further comprises:

program instructions to receive an output of the non-functional service request; and program instructions to store the output of non-functional service request in the associated memory.

9. The computer program product of claim 8, wherein notifying the guest operating system that the execution of the non-functional service request is complete further comprises:

program instructions to return execution back to the guest operating system for analysis of the output of the non-functional service request in the associated memory and determination of next processing steps based on the output.

10. The computer program product of claim 6, wherein the hypervisor is a type 2 hypervisor.

11. A computer system comprising:

one or more computer processors;

one or more computer readable storage media;

program instructions stored on the computer readable storage media for execution by at least one of the one or more processors, the program instructions comprising:

program instructions to intercept a hardware instruction from a guest operating system, wherein a hypervisor of a host operating system receives control, and wherein the hardware instruction is associated with data located in a register and in memory that is accessible by the hypervisor;

program instructions to analyze the hardware instruction and data to determine if the hardware instruction is a non-functional service request, wherein the non-functional service request is a request for a service that the guest operating system does not have access to;

program instructions to, upon determining that the hardware instruction is a nonfunctional service request, execute the non-functional service request, wherein a response of the non-functional service request is written to the associated memory that is accessible by the hypervisor;

program instructions to execute an authorization information check using one or more parameters relating to a corresponding host service, wherein executing the authorization information check includes extracting a function code, a user identification (userID), and a resource for the authorization information check, and wherein the function code identifies a requested operation, the userID identifies a user, and the resource identifies a memory location within the guest operating system;

program instructions to write an authorization information check result to a location in memory of the guest operating system, wherein the authorization information check result includes a return code; and program instructions to notify the guest operating system that the execution of the nonfunctional service request is complete and the response is available.

12. The computer system of claim 11, wherein performing a requested service of the host operating system further comprises:

program instructions to allocate a parameter list, wherein the parameter list contains a function code identifying a requested host function and function related data; and program instructions to execute the requested host service using the allocated parameter list.

13. The computer system of claim 11, wherein notifying the guest operating system that the execution of the non-functional service request is complete and the response is available further comprises:

program instructions to receive an output of the non-functional service request; and program instructions to store the output of non-functional service request in the associated memory.

14. The computer system of claim 13, wherein notifying the guest operating system that the execution of the non-functional service request is complete further comprises:

program instructions to return execution back to the guest operating system for analysis of the output of the non-functional service request in the associated memory and determination of next processing steps based on the output.

* * * * *